United States Patent
Choi et al.

(10) Patent No.: US 7,230,471 B2
(45) Date of Patent: Jun. 12, 2007

(54) CHARGE PUMP CIRCUIT OF LCD DRIVER INCLUDING DRIVER HAVING VARIABLE CURRENT DRIVING CAPABILITY

(75) Inventors: Chul Choi, Seoul (KR); Jae-Hyuck Woo, Suwon-si (KR); Jae-Goo Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 11/121,540

(22) Filed: May 4, 2005

(65) Prior Publication Data

US 2005/0248388 A1    Nov. 10, 2005

(30) Foreign Application Priority Data

May 4, 2004    (KR)    ............... 10-2004-0031354

(51) Int. Cl.
G05F 1/10    (2006.01)
(52) U.S. Cl. ................................. 327/536; 327/589
(58) Field of Classification Search ............... 327/536, 327/589, 390; 326/88
See application file for complete search history.

(56) References Cited

U.S. PATENT DOCUMENTS

| | | | | |
|---|---|---|---|---|
| 4,812,961 A | * | 3/1989 | Essaff et al. ................... | 363/61 |
| 4,897,774 A | * | 1/1990 | Bingham et al. ............. | 363/61 |
| 5,130,571 A | * | 7/1992 | Carroll ......................... | 327/94 |
| 5,550,728 A | * | 8/1996 | Ellis .............................. | 363/60 |
| 5,912,560 A | * | 6/1999 | Pasternak ..................... | 324/536 |
| 6,069,518 A | * | 5/2000 | Nakai et al. .................. | 327/535 |
| 6,265,913 B1 | * | 7/2001 | Lee et al. ..................... | 327/108 |
| 6,411,531 B1 | * | 6/2002 | Nork et al. ................... | 363/60 |
| 6,466,079 B1 | * | 10/2002 | Kushnarenko ............... | 363/60 |
| 6,937,487 B1 | * | 8/2005 | Bron ............................ | 363/60 |

FOREIGN PATENT DOCUMENTS

| | | |
|---|---|---|
| JP | 2000-1666220 | 6/2000 |
| KR | 2002-23681 | 1/2002 |
| KR | 1020020013748 | 2/2002 |
| KR | 2002-176764 | 6/2002 |
| KR | 2002-233133 | 8/2002 |
| KR | 2002-291231 | 10/2002 |

\* cited by examiner

Primary Examiner—Timothy P. Callahan
Assistant Examiner—Hai L. Nguyen
(74) Attorney, Agent, or Firm—F. Chau & Assoc., LLC

(57) ABSTRACT

A charge pump circuit of a liquid crystal display driver integrated circuit (LDI) is provided, which can reduce unnecessary current consumption when a load of an output node varies is provided, where, in a gradient mode of a display-on mode, in which an output node of the charge pump circuit has a maximum load, the current driving capability of a driver in the charge pump circuit is increased, and where, in a binary mode, in which the output node of the charge pump circuit has a smaller load than in the gradient mode, the current driving capability of the driver is lower, to prevent unnecessary current consumption caused by too large driving transfer transistors in the driver and to maintain boost efficiency at a proper level.

16 Claims, 3 Drawing Sheets

CHARGE PUMP CIRCUIT OF LCD DRIVER INCLUDING DRIVER HAVING VARIABLE CURRENT DRIVING CAPABILITY

CROSS-REFERENCE TO RELATED APPLICATION

This application claims the benefit of foreign priority under 35 U.S.C. § 119 to Korean Patent Application No. 2004-31354, filed on May 4, 2004, in the Korean Intellectual Property Office, the disclosure of which is incorporated herein in its entirety by reference.

BACKGROUND OF THE INVENTION

1. Field of the Invention

The present disclosure relates to liquid crystal display driver integrated circuits (LDI), and more particularly, to a charge pump circuit of an LDI.

2. Description of the Related Art

As shown in FIG. 1, a conventional liquid crystal display driver integrated circuit (LDI) for mobile equipment includes a source line driving voltage generating circuit 11 that generates a source line driving voltage SVDD, a common electrode driving voltage generating circuit 13 that generates a common electrode driving voltage VCOM, a gamma driving reference voltage generating circuit 15 that generates a gamma driving reference voltage (GVDD), and an LCD on/off voltage generating circuit 17 that generates an LCD on/off voltage VON/VOFF, in order to drive an LCD. Each of the source line driving voltage generating circuit 11, the common electrode driving voltage generating circuit 13, and the gamma driving reference voltage generating circuit 15 includes amplifiers.

Further, the LDI includes a charge pump circuit 19 to supply a power voltage to the circuits. The charge pump circuit 19 receives an external battery source voltage VCI of about 2.5 volts to 3.3 volts and then boosts the external battery source voltage VCI to produce a boost voltage AVDD of about 5.5 volts, and supplies the boost voltage (AVDD) to the circuits as source voltages.

Meanwhile, the LDI of FIG. 1 performs power-on operations in the sequence as illustrated in FIG. 2 to stably supply a source voltage to each of the circuits 11, 13, 15 and 17. After a reset, the charge pump circuit 19 is turned on to generate the boost voltage AVDD, and the LCD on/off voltage generating circuit 17 generates the LCD on voltage VON and the LCD off voltage VOFF in operations S1 and S2, respectively.

Next, the common electrode driving voltage generating circuit 13 and the gamma driving reference voltage generating circuit 15 are turned on by the boost voltage AVDD as a source voltage, and generate the common electrode driving voltage VCOM and the gamma driving reference voltage GVDD, respectively, in operations S3 and S4.

Finally, in a display-on mode in which an LCD panel is driven, the source line driving voltage generating circuit 11 is turned on in operations S5 through S7. The display-on mode may be a binary mode, which is a black and white mode, or a gradient mode, which is a color mode.

All of the amplifiers in the source line driving voltage generating circuit 11 are turned off in the binary mode, and are turned on in the gradient mode. Thus, the largest number of amplifiers operates in the gradient mode so that a load of an output node of the charge pump circuit 19 is maximized in the gradient mode. That is, the load derived from the boost voltage AVDD is greatest in the gradient mode.

In a conventional charge pump circuit used in an LDI, the current driving capability of a driver, such as a driving transfer transistor, which transfers a boost voltage generated in the charge pump circuit to an output node, is fixed based on the gradient mode of the display-on mode, in which the output node has a maximum load.

Accordingly, the driver consumes excess current even in an operational mode in which the charge pump circuit has a smaller load than in the gradient mode.

SUMMARY OF THE INVENTION

The present disclosure provides a charge pump circuit of an LDI that can reduce unnecessary current consumption even when a load of an output node varies.

According to an aspect of the present disclosure, there is provided a charge pump circuit including a charge pump portion for generating a boost voltage from an external source voltage by boosting the external source voltage, a driver for transferring the boost voltage to an output node, wherein the current driving capability of the driver varies according to a load derived from the boost voltage.

According to an exemplary embodiment of the present disclosure, the driver includes at least two driving transfer transistors connected in parallel between the charge pump portion and the output node, and the number of driving transfer transistors turned on varies according to the load derived from the boost voltage.

According to another aspect of the present disclosure, there is also provided a charge pump circuit of an LCD driver including a source line driving voltage generating circuit, which includes source line driving amplifiers that are all turned on in a first operating mode and are turned off in a second operating mode, the charge pump circuit including a charge pump portion for generating a boost voltage from an external source voltage by boosting the external source voltage, and a driver for transferring the boost voltage to the source line driving voltage generating circuit, wherein the current driving capability of the driver varies for the first mode and the second mode.

According to an exemplary embodiment of the present disclosure, the driver includes a first driving transfer transistor for transferring the boost voltage to the source line driving voltage generating circuit when a first control signal is enabled, and a second driving transfer transistor for transferring the boost voltage to the source line driving voltage generating circuit when a second control signal is enabled, the second driving transfer transistor being connected in parallel to the first driving transfer transistor, wherein both the first control signal and the second control signal are enabled in the first operating mode, and the first control mode is enabled and the second control signal is disabled in the second operating mode.

The first operating mode is a gradient mode of a display-on mode of the LCD driver, and the second operating mode is a binary mode of the display-on mode of the LCD driver.

BRIEF DESCRIPTION OF THE DRAWINGS

The above and other features and advantages of the present disclosure will become more apparent by describing in detail exemplary embodiments thereof with reference to the attached drawings, in which.

DETAILED DESCRIPTION OF PREFERRED EMBODIMENTS

Figure 1:
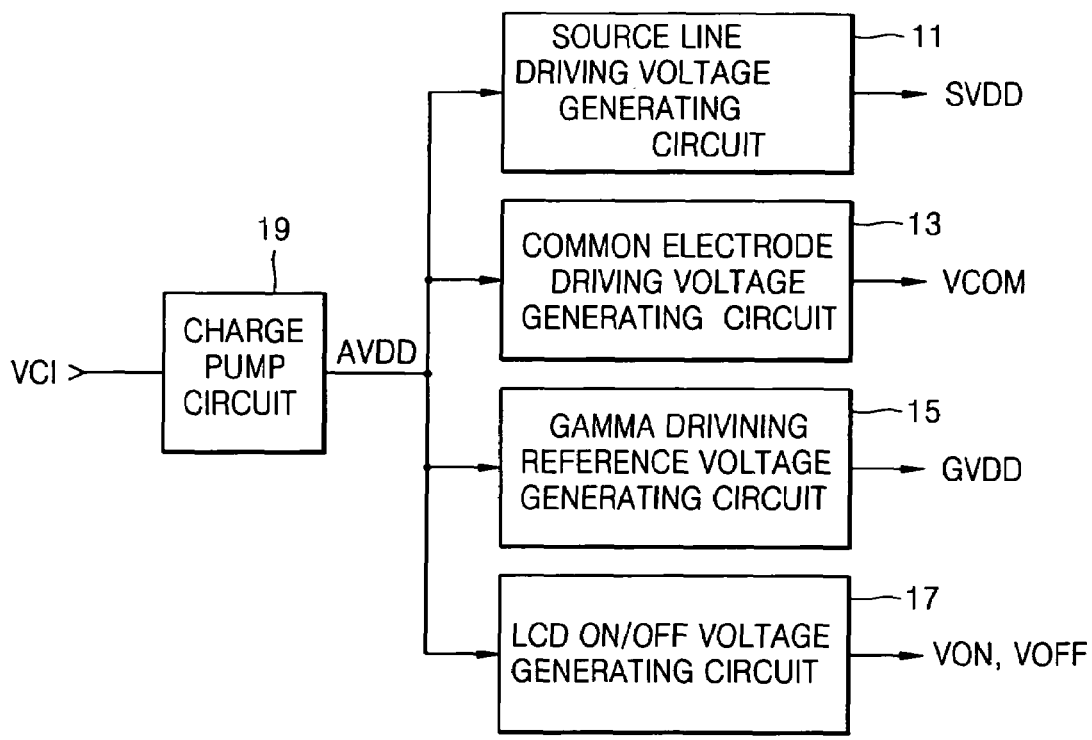
FIG. 1 is a block diagram of circuits involved in the driving of an LCD in an LCD driver IC.
Figure 2:
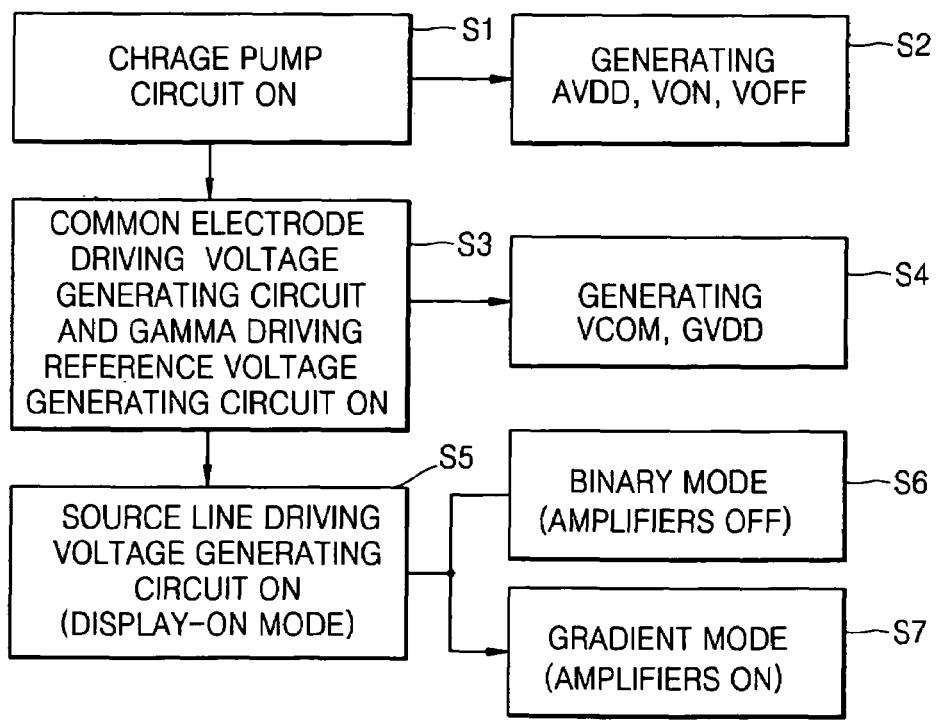
FIG. 2 is a diagram illustrating sequential power-on operations in the LCD driver IC of FIG. 1.

The present disclosure will now be described more fully with reference to the accompanying drawings, in which an exemplary embodiment of the disclosure is shown. Throughout the drawings, like reference numerals may be used to refer to like elements.

Figure 3:
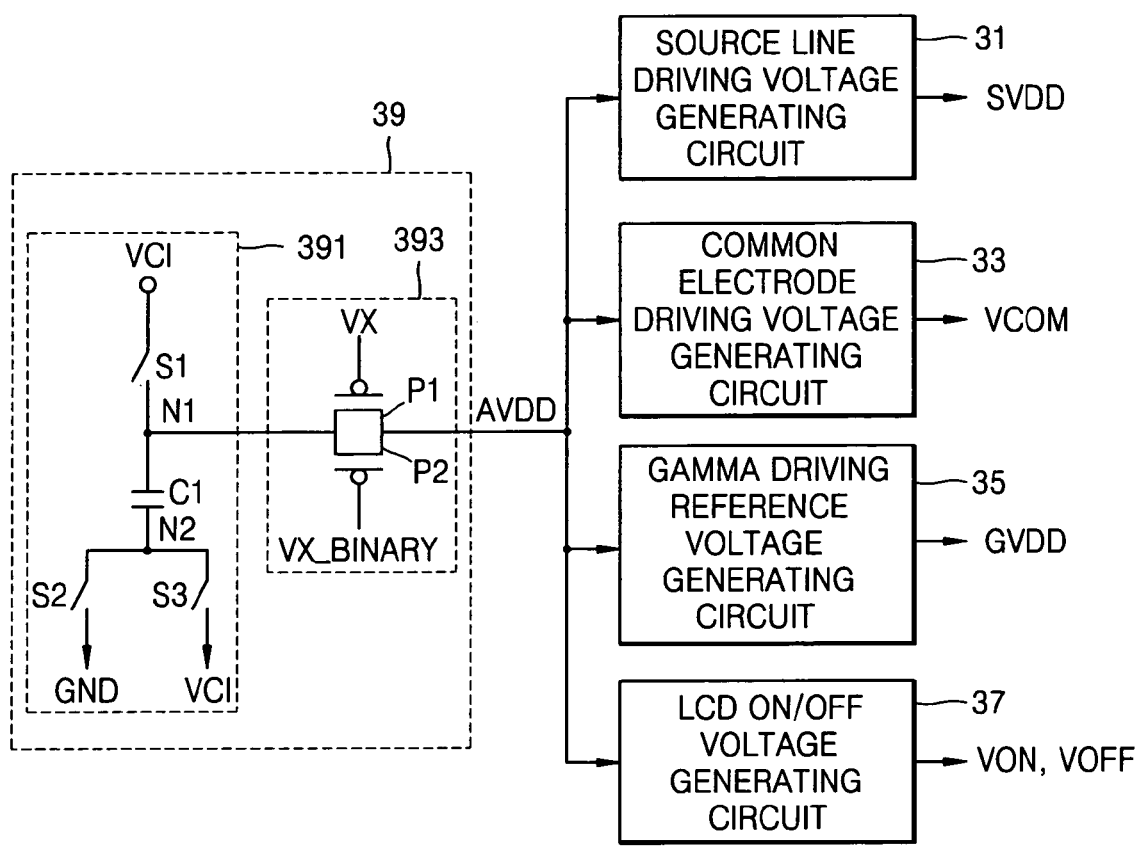
FIG. 3 is a schematic diagram illustrating a charge pump circuit according to a first embodiment of the present disclosure.

FIG. 3 is a schematic diagram illustrating a charge pump circuit 39 according to a first embodiment of the present disclosure. For the convenience of explanation, circuits 31, 33, 35, and 37 in an LCD driver IC, which are involved in the driving of an LCD, are illustrated with the charge pump circuit 39.

Referring to FIG. 3, the charge pump circuit 39 includes a charge pump portion 391 that generates a boost voltage AVDD from an external source voltage VCI by boosting the external source voltage VCI, and a driver 393 that transfers the boost voltage AVDD to an output node. In particular, the current driving capability of the driver 393 varies according to a load of the output node of the charge pump circuit 39, that is, a load derived from the boost voltage AVDD output from the output node of the charge pump circuit 39.

More specifically, the driver 393 includes a first driving transfer transistor P1 controlled by a first control signal VX, and a second driving transfer transistor P2 that is connected in parallel to the first driving transfer transistor P1 and controlled by a second control signal VX_BINARY.

In a first operational mode of an LCD driver, namely, a gradient mode of a display-on mode in which all the amplifiers in the source line driving voltage generating circuit 31 are turned on and, accordingly, a load of the output node of the charge pump circuit 39 is maximized, the first control signal VX, and the second control signal VX_BINARY are enabled. In a second operational mode of the LCD driver, namely, a binary mode of the display-on mode in which all the amplifiers in the source line driving voltage generating circuit 31 are turned off and, accordingly, a load of the output node of the charge pump circuit 39 is reduced, the first control signal VX is enabled and the second control signal VX_BINARY is disabled.

Accordingly, in the gradient mode in which a load of the output node of the charge pump circuit 39 is maximized, both the first driving transfer transistor P1 and the second driving transfer transistor P2 are turned on, and thus the current driving capability of the driver 393 is highest. On the other hand, in the binary mode in which a load of the output node of the charge pump circuit 39 is reduced, the first driving transfer transistor P1 is turned on and the second driving transfer transistor P2 is turned off, and thus the current driving capability of the driver 393 is lower.

The charge pump portion 391 includes a first switch S1, a first end of which is connected to an external source voltage VCI, a capacitor C1, a first end of which is connected to a second end of the first switch S1, a second switch S2, a first end of which is connected to a ground voltage GND and a second end of which is connected to a second end of the capacitor C1, and a third switch S3, a first end of which is connected to the external source voltage VCI and a second end of which is connected to the second end of the capacitor C1. The boost voltage AVDD is output from a connection node N1 between the first switch S1 and the capacitor C1. The first through third switches S1 through S3 may be MOS transistors. It is obvious to one skilled in the art that the charge pump portion 391 can be constructed in various forms.

Briefly, the charge pump portion 391 operates as follows. Initially, the first switch S1 is turned on and the voltage at the connection node N1 between the first switch S1 and the capacitor C1 becomes equal to the external source voltage VCI. Then, when the first switch S1 is turned off and the second switch S2 is turned on, the voltage at the connection node N1 remains at the external source voltage VCI and the voltage at a node N2 between the switches S2 and S3 becomes equal to the ground voltage GND. Subsequently, when the second switch S2 is turned off and the third switch S3 is turned on, the voltage at the node N2 becomes equal to the external source voltage VCI, and thus the voltage at the connection node N1 is boosted to double the external source voltage VCI.

The boost voltage AVDD output from the output node of the charge pump circuit 39 is supplied as a source voltage to the circuits 31, 33, 35, and 37 in the LCD driver IC which are involved in driving an LCD. A source line driving voltage generating circuit 31 generates a source line diving voltage SVDD. A common electrode driving voltage generating circuit 33 generates a common electrode driving voltage VCOM. A gamma driving reference voltage generating circuit 35 generates a gamma driving reference voltage GVDD. An LCD on/off voltage generating circuit 37 generates an LCD on voltage VON and an LCD off voltage VOFF. These circuits are included in a common LCD driver IC, and thus, detailed descriptions thereof are omitted.

As described above, in the charge pump circuit according to the first embodiment of the present disclosure, the current driving capability of the driver 393 is increased in the gradient mode in which the output node of the charge pump circuit has a maximum load, and the current driving capability of the driver 393 is reduced in the binary mode in which the output node has a smaller load.

In other words, since the current driving capability of the driver 393 can be small in the binary mode in which the output node of the charge pump 39 has a small load, a second driving transfer transistor P2 of the driver 393 is turned off and only a first transfer transistor P1 of the driver 393 is turned on. As a result, it is possible to prevent unnecessary current consumption caused by large driving transistors and to maintain boost efficiency at a proper level, thereby preventing operations at a voltage greater than a process withstand voltage.

Figure 4:
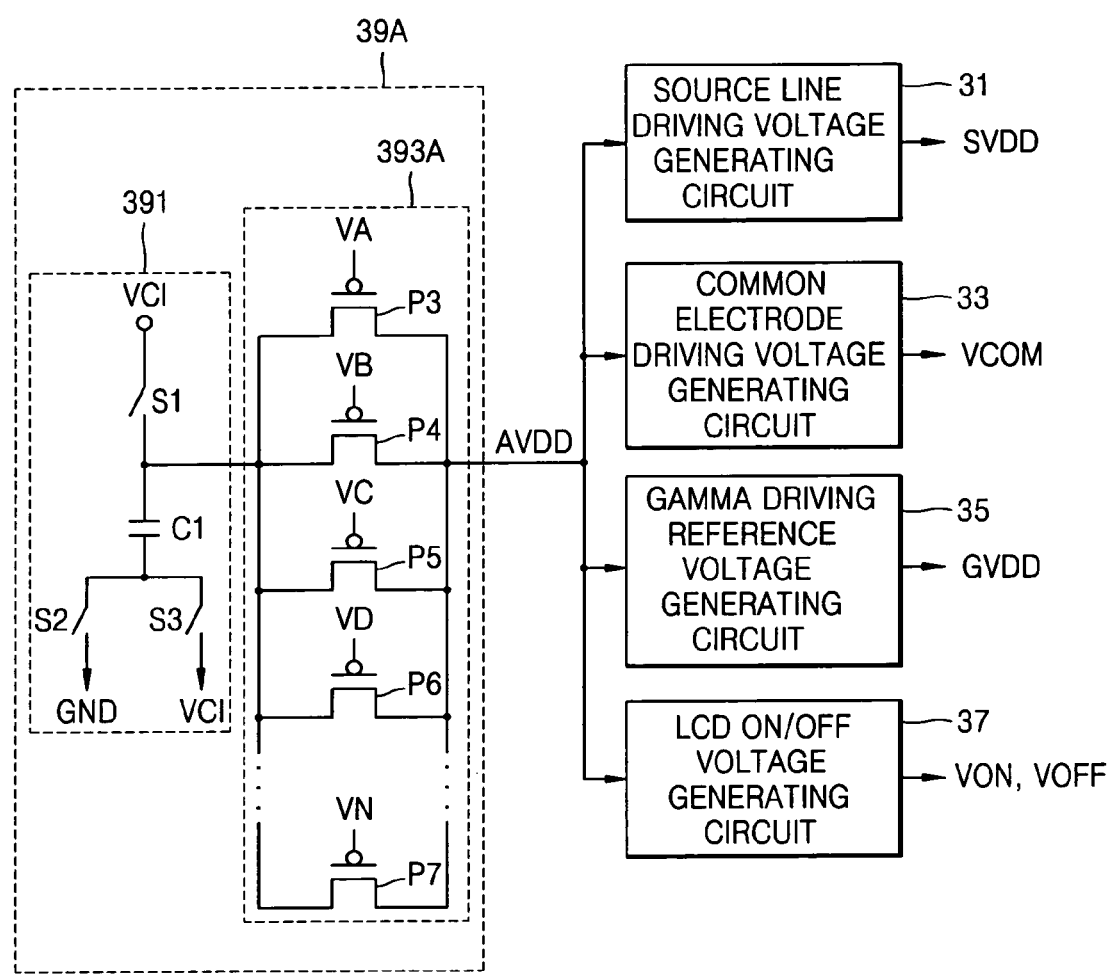
FIG. 4 is a schematic diagram illustrating a charge pump circuit according to a second embodiment of the present disclosure.

FIG. 4 is a schematic diagram illustrating a charge pump circuit 39A according to a second embodiment of the present disclosure. Referring to FIG. 4, in the charge pump circuit 39A according to the second embodiment of the present disclosure, the structure of a driver 393A differs from the structure of the driver 393 according to the first embodiment. The current driving capability of the driver 393A varies corresponding to a load of an output node of the charge pump circuit 39A. That is, it varies with a load derived from a boost voltage AVDD output from the charge pump circuit 39A.

In particular, the driver 393A includes a plurality of driving transfer transistors P3 through P7, respectively controlled by control signals VA, VB, VC, VD, and VN, and connected in parallel to one another. The number of driving transfer transistors which are turned on among the transistors P3 through P7 varies in response to control signals VA, VB, VC, VD, and VN, of which states depend on a load of the output of the charge pump circuit 38A.

In other words, it is possible to prevent unnecessary current consumption in the driver 393A and to maintain the boost efficiency by selectively operating driving transfer transistors P3 through P7 for various LCD driver operation modes in which the load of the output node of the charge pump circuit 39A varies, as well as in the gradient mode and the binary mode.

As described above, the charge pump circuit of an LCD driver according to the present disclosure can prevent unnecessary current consumption and maintain boost efficiency at a proper level when the load of an output node varies according to operational modes.

While the present disclosure has been particularly shown and described with reference to exemplary embodiments thereof, it will be understood by those of ordinary skill in the pertinent art that various changes in form and details may be made therein without departing from the spirit and scope of the present disclosure as defined by the following claims.

What is claimed is:

1. A charge pump circuit comprising:
   a charge pump portion for generating a boost voltage from an external source voltage by boosting the external source voltage; and
   a driver in signal communication with the charge pump portion for transferring the boost voltage to an output node and including at least two driving transfer transistors, wherein the current driving capability of the driver varies according to a load driven by the boost voltage,
   such that in a binary mode only one driving transfer transistor is turned on and in a gradient mode at least two of the driving transfer transistors are turned on.

2. The charge pump circuit of claim 1, wherein the at least two driving transfer transistors are connected in parallel between the charge pump portion and the output node.

3. The charge pump circuit of claim 1, the charge pump portion comprising:
   a first switch, a first end of which is connected to the external source voltage;
   a capacitor, a first end of which is connected to a second end of the first switch;
   a second switch, a first end of which is connected to a ground voltage and a second end of which is connected to a second end of the capacitor; and
   a third switch, a first end of which is connected to the external source voltage and a second end of which is connected to the second end of the capacitor,
   wherein the boost voltage is output from the second end of the capacitor.

4. The charge pump circuit of claim 3, wherein the first through third switches are MOS transistors.

5. A charge pump circuit of an LCD driver comprising a source line driving voltage generating circuit, which includes source line driving amplifiers that are all turned on in a gradient operating mode and that are turned off in a binary operating mode, the charge pump circuit comprising:
   a charge pump portion for generating a boost voltage from an external source voltage by boosting the external source voltage; and
   a driver in signal communication with the charge pump portion for transferring the boost voltage to the source line driving voltage generating circuit and including at least two driving transfer transistors, wherein the current driving capability of the driver varies for the gradient mode and the binary mode, such that in response to a binary control signal only one driving transfer transistor is turned on and in response to a gradient control signal at least two driving transfer transistors are turned on.

6. The charge pump circuit of an LCD driver of claim 5, the driver comprising: a gradient driving transfer transistor being turned on for transferring the boost voltage to the source line driving voltage generating circuit when the gradient control signal is enabled; and a binary driving transfer transistor being turned on for transferring the boost voltage to the source line driving voltage generating circuit when the gradient control signal is enabled and when the binary control signal is enabled, the binary driving transfer transistor being connected in parallel with the gradient driving transfer transistor,
   wherein both the gradient control signal and the binary control signal are enabled in the gradient operating mode, and the binary control signal is enabled and the gradient control signal is disabled in the binary operating mode.

7. The charge pump circuit of an LCD driver of claim 5, the charge pump portion comprising:
   a first switch, a first end of which is connected to the external source voltage;
   a capacitor, a first end of which is connected to a second end of the first switch;
   a second switch, a first end of which is connected to a ground voltage and a second end of which is connected to a second end of the capacitor; and
   a third switch, a first end of which is connected to the external source voltage and a second end of which is connected to the second end of the capacitor,
   wherein the boost voltage is output from the second end of the capacitor.

8. The charge pump circuit of an LCD driver of claim 7, wherein the first through third switches are MOS transistors.

9. A method of charge pumping comprising:
   generating a boost voltage from an external source voltage by boosting the external source voltage; and
   transferring the boost voltage to an output node using driving transfer transistors, wherein the current driving capability of the driver varies according to a load driven by the boost voltage, and including turning on one of the driving transfer transistors during binary mode and turning on at least two of the driving transistors during a gradient mode.

10. The method as defined in claim 9, further comprising outputting the boost voltage from a capacitor.

11. The method as defined in claim 10, further comprising switching the boost voltage with MOS transistors.

12. A method as defined in claim 9, further comprising:
   turning on source line driving amplifiers in the gradient operating mode;
   turning off the source line driving amplifiers in the binary operating mode;
   generating the boost voltage from an external source voltage by boosting the external source voltage; and
   transferring the boost voltage from the output node to the source line driving voltage generating circuit.

13. The method as defined in claim 12 wherein the gradient operating mode is a gradient display-on mode of an LCD driver.

14. The method as defined in claim 12 wherein the binary operating mode is a binary display-on mode of an LCD driver.

15. The method as defined in claim 12, further comprising outputting the boost voltage from a capacitor.

16. The method as defined in claim 15, further comprising switching the boost voltage with MOS transistors.

* * * * *